(12) United States Patent
Dreyer et al.

(10) Patent No.: US 8,935,116 B2
(45) Date of Patent: Jan. 13, 2015

(54) METHOD AND APPARATUS FOR TESTING A WIND TURBINE INSTALLATION

(75) Inventors: Thomas Dreyer, Achim (DE); Tobias Siepker, Bremen (DE)

(73) Assignee: Siemens Aktiengesellschaft, Munich, (DE)

( * ) Notice: Subject to any disclaimer, the term of this patent is extended or adjusted under 35 U.S.C. 154(b) by 464 days.

(21) Appl. No.: 13/401,007

(22) Filed: Feb. 21, 2012

(65) Prior Publication Data

US 2012/0221281 A1    Aug. 30, 2012

(30) Foreign Application Priority Data

Feb. 28, 2011   (EP) ...................................... 11156223

(51) Int. Cl.
*G06F 11/00*   (2006.01)
*F03D 11/00*   (2006.01)

(52) U.S. Cl.
CPC ... *F03D 11/0091* (2013.01); *F05B 2270/10711* (2013.01); *Y02E 10/722* (2013.01)
USPC ........................................................ 702/115

(58) Field of Classification Search
CPC ..... C01B 31/00; C01B 31/02; F03D 11/0091; F03D 7/00
USPC .......................................... 702/115, 182–185
See application file for complete search history.

(56) References Cited

U.S. PATENT DOCUMENTS

2014/0015250 A1 *   1/2014   Teodorescu et al. ............ 290/44

FOREIGN PATENT DOCUMENTS

WO   WO 2007140789 A1   12/2007
WO   WO 2008074324 A2   6/2008

OTHER PUBLICATIONS

S. Seman, J. Niiranen, R. Virtanen, J.-P. Matsinen: "Low Voltage Ride-Through Analysis of 2 MW DFIG Wind Turbine—Grid Code Compliance Validations"; Power and Energy Society General Meeting—Conversion and Delivery of Electrical Energy in the 21st Century, pp. 1-6, XP031304475; Others; 2008.
E. Gomez-Lazaro, M. Canas, J. A. Fuentes, A. Molina-Garcia: "Characterization of Measured Voltage Dips in Wind Farms in the Light of the New Grid Codes", Power Tech, pp. 2059-2064, XP031269696; Others; 2007.

* cited by examiner

*Primary Examiner* — Edward Raymond

(57) ABSTRACT

A method is provided for testing a wind turbine installation in respect of riding through a voltage dip. As per the method, a voltage dip is simulated and measured data is obtained on the performance of the wind turbine installation based on the simulated voltage dip. The measured data obtained is analyzed regarding variables defined in performance requirements and their permitted values. The measured data is combined to form a measured dataset in a standardized measured data format. The measured dataset is forwarded to an automatic analysis unit which stores evaluation criteria. The analysis unit performs the tasks of deriving values for the variables defined in the performance requirements from the measured data, comparing the values of the variables with the permitted values contained in the performance requirements, performing an evaluation of the comparison according to the stored evaluation criteria and keeping the result of the evaluation ready for output.

6 Claims, 4 Drawing Sheets

METHOD AND APPARATUS FOR TESTING A WIND TURBINE INSTALLATION

CROSS REFERENCE TO RELATED APPLICATIONS

This application claims priority of European Patent Office application No. 11156223.7 EP filed Feb. 28, 2011. All of the applications are incorporated by reference herein in their entirety.

FIELD OF INVENTION

The present invention relates to a method and an apparatus for testing a wind turbine installation in respect of riding through a voltage dip.

BACKGROUND OF INVENTION

If wind turbine installations are linked to a power grid, they must satisfy certain requirements. These requirements are laid down in grid codes, which contain performance requirements for defined variables which the wind turbine installation must comply with. For example, most grid codes also lay down that the wind turbine installation must be able to ride through particular voltage dips in the grid without the wind turbine installation having to be taken off the grid.

Hence when integrating a wind turbine installation into a grid it is necessary to check whether all performance requirements laid down in the grid codes are complied with. Hence at present all new developments of wind turbine installations and in some cases also old wind turbine installations are subject to various measurements regarding grid integration/grid requirements, in order to test compliance with the performance requirements. Part of this test also relates to the ability of the wind turbine installation to ride through a voltage dip and to support the grid by supplying reactive power. These tests, which are performed either by the manufacturer himself or by external suppliers, entail not only recording the measured data but also extensive postprocessing, in which the measured data is managed, documented, processed, displayed and evaluated. The postprocessing then results in extensive reports.

SUMMARY OF INVENTION

Given this prior art it is the object of the present invention to provide an advantageous method together with an advantageous apparatus for testing a wind turbine installation in respect of riding through a voltage dip.

This object is achieved by a method as claimed in claim 1 and/or a test apparatus as claimed in claim 5. The dependent claims contain advantageous embodiments of the invention.

In the inventive method for testing a wind turbine installation in respect of riding through a voltage dip, a voltage dip is simulated. Based on the simulated voltage dip, measured data on the performance of the wind turbine installation is obtained and defined variables and their permitted values are analyzed in respect of performance requirements (grid codes). In this case the measured data is combined to form a measured dataset in a standardized measured data format and this is then passed to an automatic analysis unit. Values for the variables defined in the performance requirements are derived from the measured data in the automatic analysis unit and the derived values are compared with the permitted values contained in the performance requirements. Furthermore an evaluation of the comparison is undertaken in line with evaluation criteria which are stored in the analysis unit, and the result of the evaluation is kept ready for output, preferably in a standardized form. The stored evaluation criteria can either be taken from the performance requirements or laid down by the manufacturer or certifier of the wind turbine. In the latter case the evaluation criteria can in particular be more stringent than in a grid code, for example if the wind turbine is to satisfy several different grid codes and hence for each defined variable the strictest evaluation criterion from both grid codes must be enlisted.

The inventive method allows the test in respect of riding through a voltage dip to be fully automated, in particular by storing evaluation criteria in the analysis unit. In this way the postprocessing can be accelerated and systematized compared to the manual postprocessing currently employed. Thanks to the time saving it is possible to state more quickly whether a test in accordance with corresponding requirements has been passed than in the case of manual postprocessing. Furthermore, automation means the reproducibility of the results is increased. Additionally, costs can be reduced, because employees do not have to be trained so intensively in postprocessing the measured data, in particular in the evaluation criteria, as the postprocessing is entirely performed by the analysis unit. This saves time and resources. Furthermore, a saving can be made on software for manually analyzing the measured data, which likewise results in a reduction in costs.

The automatic analysis unit in particular derives values for at least one of the following variables from the measured dataset:
duration of the voltage dip
depth of the voltage dip
time taken for active power to return to 90%
time taken for active power to return to 95%
reactive current in the voltage dip
maximum power consumption of the wind turbine installation
active power during the voltage dip
k-factor (ratio between line and ground impedance)
irreactive recover time (recover time without reactive current).

In addition to evaluating the comparison of the values of the variables derived from the measured data with the permitted values contained in the performance requirements the analysis unit can derive the status of the wind turbine installation from the measured dataset. The option further exists of also automatically generating a documentation table on the basis of the measured dataset. This too results in a time saving and in reproducible results compared to generating a documentation table manually.

An inventive test apparatus for testing a wind turbine installation with a control system in respect of riding through a voltage dip comprises at least a measured data capture unit, a measured data converter and an analysis unit. The measured data capture unit has an interface for connection to the control system of the wind turbine installation and is designed to capture all or selected measured data from the control system. The measured data converter is connected to the measured data capture unit in order to receive the captured measured data. In the measured data converter the captured measured data is combined to form a standardized measured dataset. The analysis unit is connected to the measured data converter in order to receive the measured dataset. It has a rule memory, a requirements memory and a criteria memory, which can be designed as physically separate memories or as logical regions of a single physical memory. The rule memory stores calculation rules for calculating the values of particular variables from the measured dataset, the requirements memory contains the values permitted for the particular variables, and the criteria memory contains evaluation criteria for evaluating a comparison of the calculated values with the permitted values. The analysis unit is designed, in accordance with an automated diagram, to derive values from the measured dataset for the variables defined in the performance requirements, to compare the derived values with the permitted values contained in the performance requirements, to undertake an evaluation of the comparison in accordance with predefined criteria and to keep the result of the evaluation available for output, for example in a standardized form. To this end the analysis unit has a calculation unit connected to the measured data converter and the rule memory, which calculation unit derives values for the particular variables from the measured dataset. Connected to the calculation unit is a comparison unit which is additionally connected to the requirements memory. In the comparison unit the values of the particular variables derived from the measured dataset are compared with the permitted values contained in the requirements memory. Further, the analysis unit has an evaluation unit which is connected to the comparison unit and the criteria memory, undertakes an evaluation of the comparison in accordance with the evaluation criteria and keeps the result of the evaluation ready for output, preferably in a standardized form. Optionally the inventive apparatus can also comprise a display unit connected to the evaluation unit in order to receive the evaluation output, to display the evaluation received.

Using the inventive test apparatus the inventive method for testing a wind turbine installation can be performed automatically. Hence the advantages described in respect of the inventive method are achieved with the inventive test apparatus.

In addition the inventive test apparatus can have at least one of the following units, in order to be able to document the test procedure.

A documentation unit, which is connected to the analysis unit, in particular to its evaluation unit, in order to receive the evaluation output preferably together with the evaluation criteria, and which stores the evaluation received, where appropriate together with the evaluation criteria.

A logging unit, which is connected to the analysis unit, in particular to its calculation unit, in order to receive the variables derived from the measured dataset as well as their values, preferably together with the calculation rules, and which logs the variables received as well as their values, where appropriate together with the calculation rules.

A measured data logging unit, which is connected to the measured data capture unit in order to receive the measured data and which logs the measured data received.

A measured dataset logging unit, which is connected to the measured data converter in order to receive the measured dataset and which logs the measured dataset received.

The logging units referred to need not be present as objectively separate units, but can also be executed as logical subunits of a single logging unit.

To ensure that the test procedure is documented as fully as possible it is advantageous if the documentation unit, the logging unit, the measured data logging unit and the measured dataset logging unit are all present.

BRIEF DESCRIPTION OF THE DRAWINGS

Further features, attributes and advantages of the present invention emerge from the following description of an exemplary embodiment with reference to the attached figures.

DETAILED DESCRIPTION OF INVENTION

Figure 4:
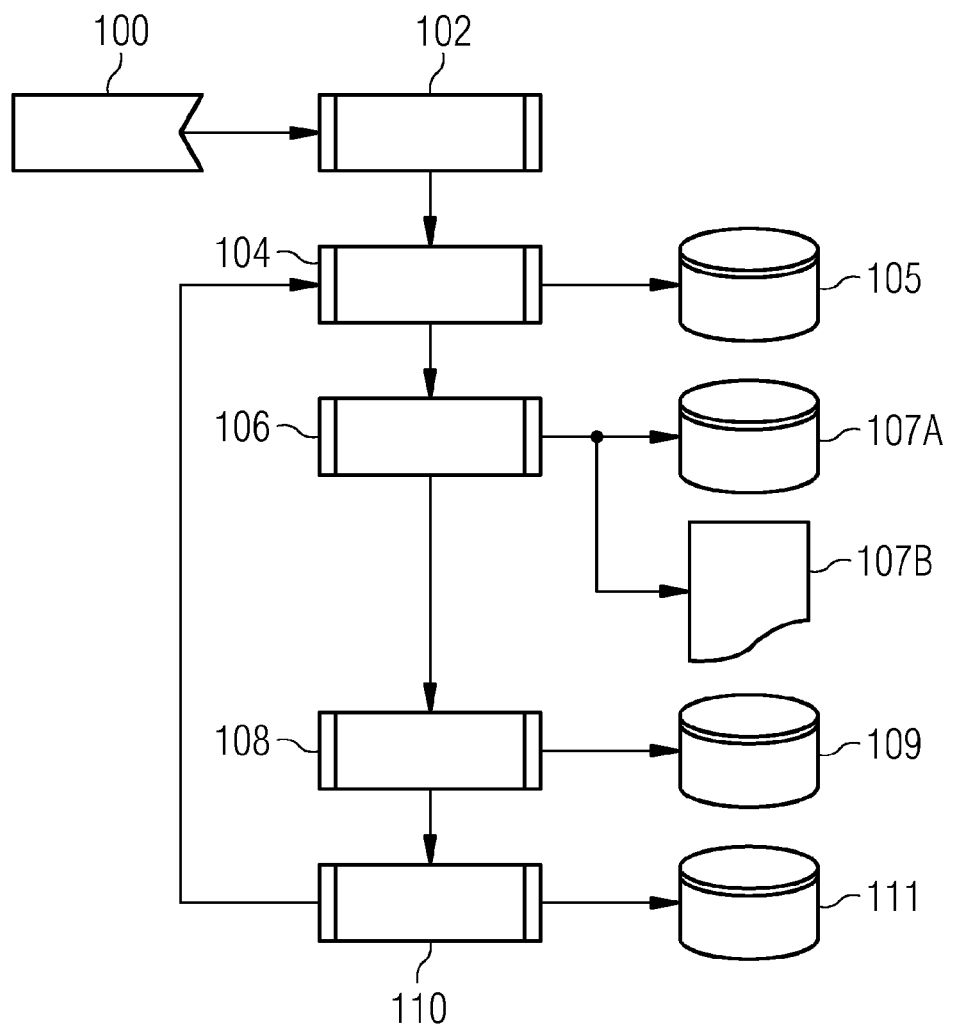
FIG. 4 shows the automatic process control in the inventive method for testing a wind turbine installation.
Figure 5:
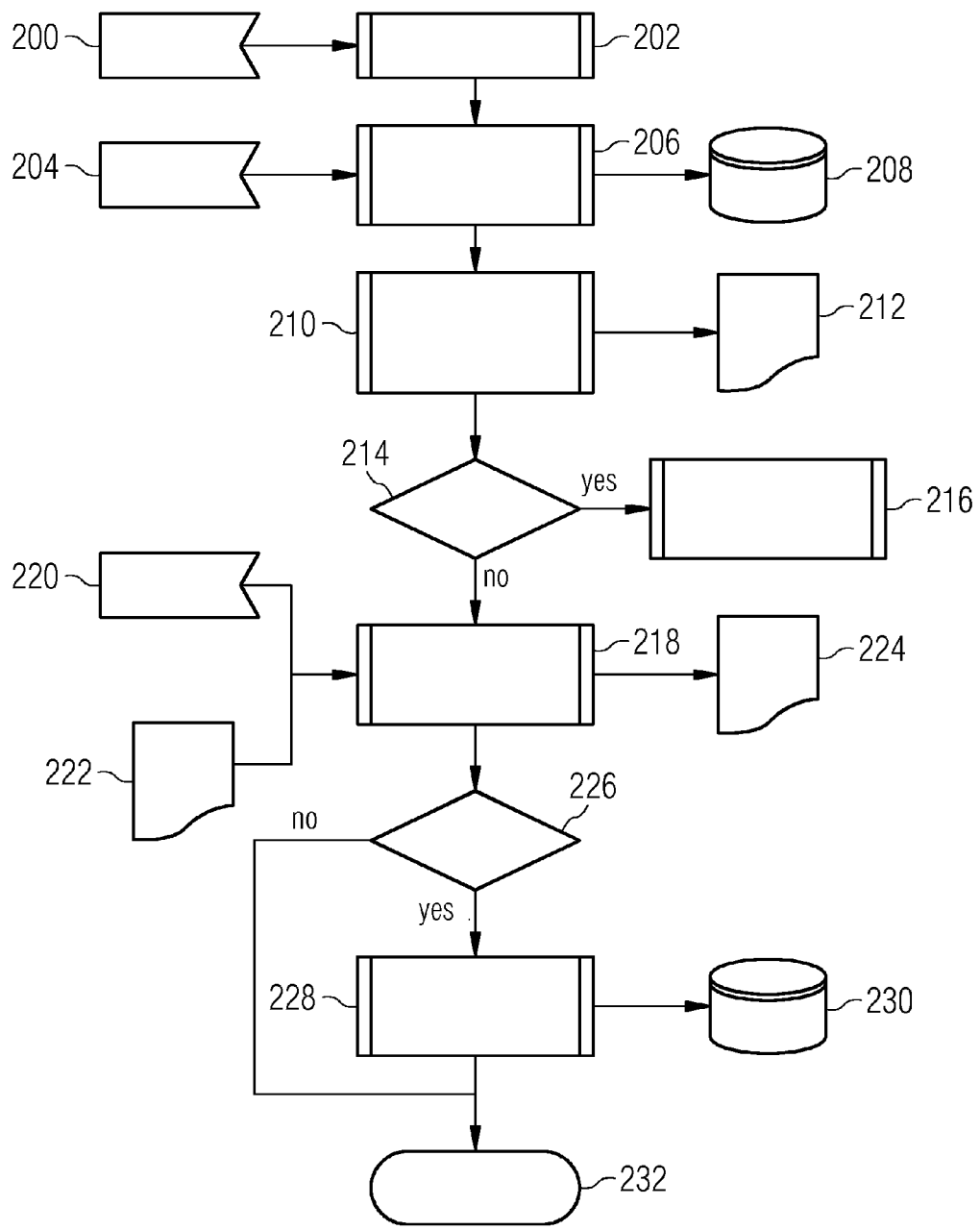
FIG. 5 shows the automatic analysis of a measured dataset.

The inventive test apparatus for testing a wind turbine installation will be described below with reference to FIGS. 1 to 3, following which the test method will be described with reference to FIGS. 4 and 5.

Figure 1:
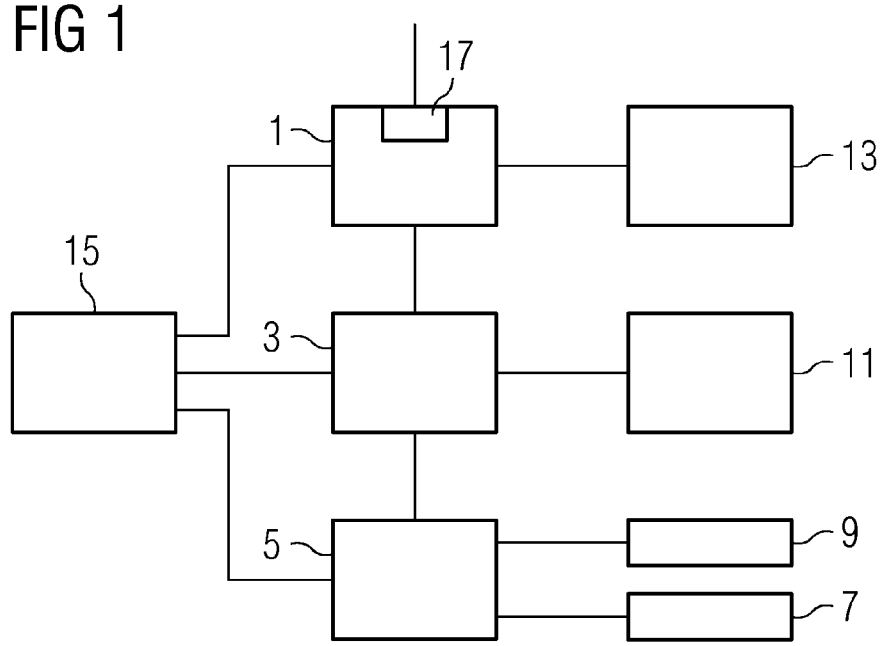
FIG. 1 shows a first exemplary embodiment for the inventive test apparatus.

FIG. 1 shows an exemplary embodiment for an inventive apparatus for testing a wind turbine installation with a measured data capture unit 1, a measured data converter 3 and an analysis unit 5. In addition the apparatus comprises optional modules, namely a documentation unit 7 connected to the analysis unit, a logging unit 9 likewise connected to the analysis unit, a measured dataset logging unit 11 connected to the measured data converter 3 and a measured data logging unit 13 connected to the measured data capture unit 1. In the present exemplary embodiment the apparatus additionally comprises a display unit 15, with which the result of the test can be displayed. The display unit 15 can for example in the simplest case be a monitor or a printer, but typically it is implemented in the form of a PC. If it is implemented as a PC, it can simultaneously also act as an input and control unit for the test apparatus, as is the case in the present exemplary embodiment.

The measured data receiving unit 1 has an interface 17 for connection to the control system of a wind turbine installation. Selected measured data can be retrieved via the interface 17 by the control system of the wind turbine installation. Configuration of the measured data receiving unit 1 in respect of the control system to be addressed is effected via the control unit 15. This can be used in particular to input IP addresses and user data for the control system to be addressed.

The connection to the control system can be effected either via a direct wired or wireless connection, via a local network (LAN) or essentially also via the Internet.

The measured data receiving unit 1 is connected to the measured data converter 3. This receives the measured data retrieved by the control system of the wind turbine installation from the measured data receiving unit 1 and generates measured datasets in a predefined format. A format frequently used for such measured datasets is the "FAMOS" data format, which can also be used in the present case.

The measured data converter 3 is connected not only to the measured data receiving unit but also to the analysis unit 5, to which it outputs the measured datasets generated. A multi-step analysis of the measured datasets is performed in the analysis unit. Firstly values for the variables defined in the performance requirements (grid codes) are derived from the measured data contained in a measured dataset, which measured data represents the performance of the wind turbine installation when riding through a simulated voltage dip. These variables are then compared to the permitted value ranges contained in the performance requirements and an evaluation of the comparison is performed in accordance with predefined criteria. Such criteria can for example in the simplest case lead to the mere statement that the value range is or is not complied with. However, more complex evaluation criteria are also possible, which perhaps also take into account whether the value derived from the measured dataset lies at the limits of the permitted value range or in the middle of the permitted value range. In addition it is also possible to take into account the criterion for a variable from the result of the comparison of other variables with the value ranges predefined for these other variables. Thus for example the permitted value range for a particular variable may depend on what value another variable has.

Once the evaluation of the comparison has been performed in accordance with predefined criteria, the result of the evaluation is put into a standardized form in the present exemplary embodiment, and is kept ready for output by the analysis unit 5.

Figure 2:
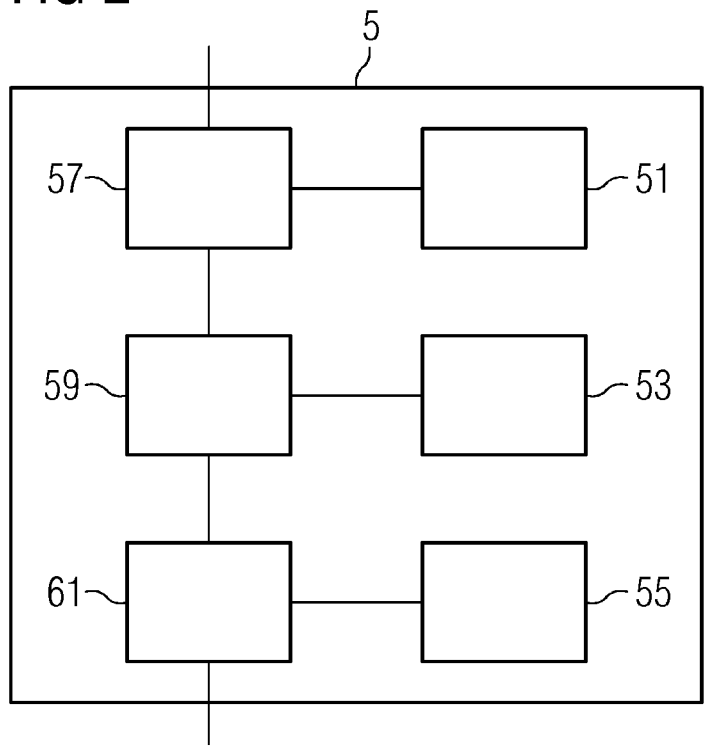
FIG. 2 shows the analysis unit of the test apparatus.

The structure of the analysis unit is illustrated schematically in FIG. 2. In the present exemplary embodiment it comprises three memories, namely a rule memory 51, a requirements memory 53 and a criteria memory 55. The rule memory 51 stores predefined variables as well as calculation rules for calculating the values of these variables from the measured dataset. The predefined variables and the calculation rules can be taken from the grid codes or from other performance requirements for the wind turbine installation. They can for example be written to the rule memory 51 via the PC 15.

Stored in the requirements memory 53 are the permitted values for the predefined variables as per the performance requirements. The permitted values can for example be written to the requirements memory 53 via the PC 15.

The criteria memory contains evaluation criteria, based on which the values of the predefined variables calculated from the measured dataset can be compared with the permitted values derived in the requirements memory 53.

The analysis unit 5 additionally has a calculation unit 57 which is connected to the measured data converter 3 in order to receive the measured dataset, and to the rule memory 51 in order to receive the predefined variables as well as the associated calculation rules. The values for the predefined variables are calculated in it from the measured dataset.

A comparison unit 59 is connected to the calculation unit 57.

In addition the comparison unit 59 is connected to the requirements memory 53. In the comparison unit 59 the values calculated for the predefined variables are compared with the permitted values contained in the requirements memory 53.

Also present in the analysis unit 5 is an evaluation unit 61, which is connected to the comparison unit 59 in order to receive the result of the comparison, and to the criteria memory 55 in order to receive the evaluation criteria and which evaluates the result of the comparison on the basis of the evaluation criteria.

The result of the evaluation is then put into a standardized form by the evaluation unit 61 in the present exemplary embodiment and is output from the analysis unit 5.

The PC 15 representing both the control unit and the display unit in the present exemplary embodiment is connected to the measured data receiving unit 1, to the measured data converter 3 and to the analysis unit 5. It can be used for example to input the criteria for evaluating the comparison into the analysis unit 5. Likewise it is possible to use the PC 15 to input a format requirement for generating the measured datasets into the measured data converter 3.

Furthermore, in the present exemplary embodiment a documentation unit 7 and a logging unit 9 are connected to the analysis unit 5. Whereas the documentation unit 7 receives the result of the evaluation from the analysis unit 5 and saves it for documentation purposes, the logging unit 9 receives the variables derived from the measured dataset together with their values. In the present exemplary embodiment the logging unit additionally receives the calculation rules according to which the values of the derived variables are calculated. Both are stored together in a log file.

In the present exemplary embodiment the documentation unit 7 additionally receives the evaluation criteria according to which the comparison of the variables with the permitted values is evaluated. Both are stored in a documentation file. If the evaluation criteria are permanently predetermined, where appropriate the documentation of the criteria used can be dispensed with.

The measured data converter 3 too is connected to a logging unit, namely the measured dataset logging unit 11. This logging unit receives the generated dataset from the measured data converter and saves it in a log file.

Likewise the measured data capture unit 1 is connected to a logging unit, namely to the measured data logging unit 13. This receives the raw measured data retrieved by the control system of the wind turbine installation from the measured data capture unit 1 and saves it in a log file. In addition it may be advantageous if it also receives the configuration on which the retrieval of the measured data is based and saves it in the log file.

Overall it is advantageous if the logging of the method performed in the test apparatus takes place with as few gaps as possible, in order to analyze the test procedure later if necessary, or to be able to compare it with other test procedures.

Although in the present exemplary embodiment the documentation unit 7 and the various logging units 9, 11, 13 are represented as separate units, they can also be implemented in the form of a single unit. In particular the logged data can also be written to a single log file, which furthermore for example can be appended to the documentation file or integrated into it.

Like the logging units and the documentation unit, the memories 51, 53, 55 can also be implemented as logical subdivisions of a single physical memory.

Figure 3:
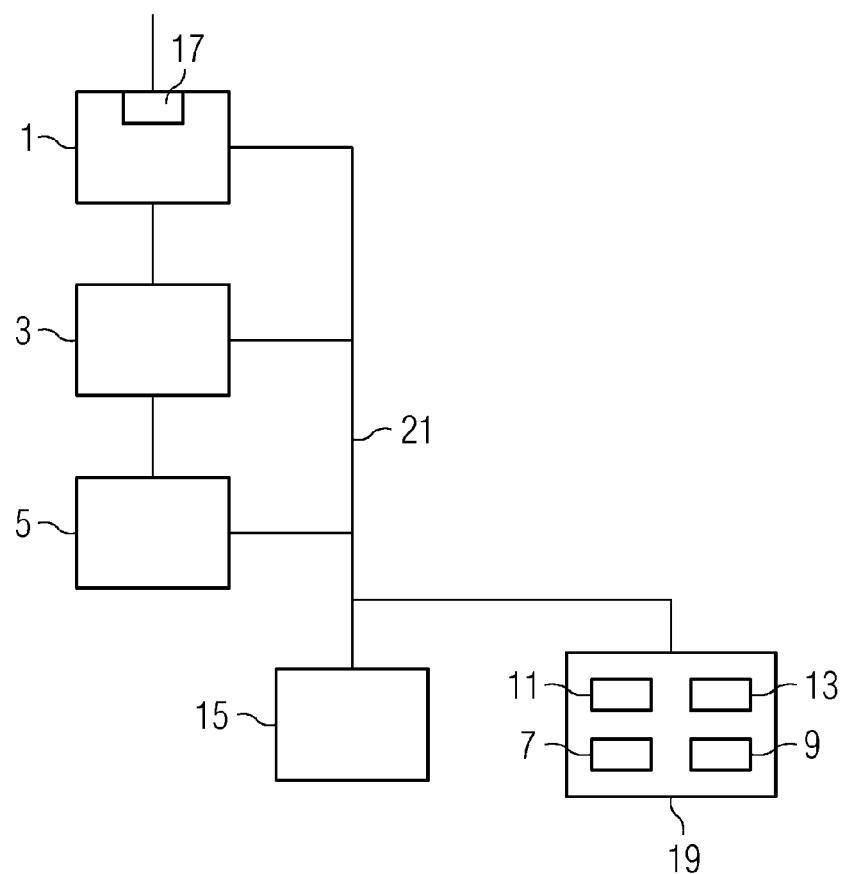
FIG. 3 shows a modification of the first exemplary embodiment.

A modification of the inventive apparatus is illustrated in FIG. 3. Elements corresponding to elements from FIG. 1 are designated by the same reference characters as in FIG. 1 and are not explained again, in order to avoid unnecessary repetitions. Hence only the differences between the test apparatus illustrated in FIG. 3 and the test apparatus illustrated in FIG. 1 are dealt with.

In contrast to the test apparatus illustrated in FIG. 1, in the test apparatus illustrated in FIG. 3 the documentation unit 7 as well as all logging units 9, 11, 13 are integrated into a common documentation/logging unit 19. In addition a bus 21 is present, which is connected to the measured data receiving unit 1, the measured data converter 3, the analysis unit 5, the PC 15 and the documentation and logging unit 19. All data transfers between the individual units are effected via this bus 21. Although the documentation and logging unit in FIG. 3 is illustrated as an individual unit, it can also be integrated into the PC 15 in the faun of software. Likewise, the measured data capture unit, the measured data converter 3 and the analysis unit 5 can also be integrated into the PC 15 in the form of software. FIGS. 1 to 3 hence illustrate not physical units, but logical units.

In explanation of the inventive method, the automatic process control used in connection with the method is described below with reference to FIG. 4 and the analysis taking place in the analysis unit 5 is described with reference to FIG. 5.

In connection with the process control the measured data receiving unit 1 is configured in a first step 100. To this end the IP addresses and the user data for the measurement systems from which measured data is to be retrieved are input using the control computer 15. In the next step 102 the measured data receiving unit 1 connects to the control system of the wind turbine installation, in order to start the measurement in step 104, and in step 106 to receive the measured data captured by the measurement systems. In connection with a test to ride through a voltage dip, measurements are taken in both the low voltage (LV) and the medium voltage (MV) range. Thus to start the measurement, datasets for starting both measurements are output to the measurement systems of the control system of the wind turbine installation (step 105). The measured data received from the measurement systems in turn contains data for the low voltage range, referred to in the following as LV data, and data for the medium voltage range, referred to in the following as MV data, and is transferred to the measured data converter 108. Both the LV data and the MV data is additionally transferred in the present exemplary embodiment to the control computer 15 (step 107a) and to the measured data logging unit 13 (step 107b), where the data is input into a test schedule log together with the date, the file name, the test number, etc. After converting the LV data and MV data into the standardized data format (step 108) the LV and MV datasets generated are both combined to form a dataset pair (step 110). Both the individual datasets and also the dataset pair are output to the control computer and/or the measured dataset logging unit 11 (steps 109 and 111). From step 110 the process control can then revert to step 104 and start a fresh measurement of LV data and MV data.

The measured dataset pair generated by the measured data converter 3 is finally output to the analysis unit 5, where the datasets of the dataset pair are analyzed. The analysis is explained in greater detail below on the basis of an exemplary embodiment with reference to FIG. 5.

Parameters required for the analysis are input in the first step of the analysis 200. These parameters can in particular comprise channel names, pitches, offsets, etc. Once these parameters have been input and processed in step 202 in the analysis unit 15, the dataset pair is received in step 204, and from this the values of particular variables are then calculated in step 206. These variables, in each case separately for the LV data and the MV data, can in particular comprise: line-to-line voltages and currents, r.m.s. values of the voltages and currents, voltages and currents in the positive-sequence system, in the negative-sequence system and in the zero-sequence system, and k-factor. In step 208 the calculated variables are output to the logging unit 9, where they are saved in a log file.

Once the values for the particular variables have been calculated in step 206, the variables required for the evaluation are measured in step 210. These are the duration of the voltage dip, the depth of the voltage dip, both in the LV range and the MV range, the time taken for active power to return to 90% and to 95%, the reactive current in the trough of the voltage dip, the recover time without reactive current, the maximum power consumption during the voltage dip, the active power during the voltage dip and the k-factor. In addition, the status of the variables representing the status of the wind turbine installation can be measured. In step 212 the measured variables can be output to the logging unit 9, where they are input into a log file.

Step 214 asks whether the measured variables should be displayed graphically. If so, they are output to the PC 15, where they can be displayed graphically (step 216). On the basis of the graphic display a manual evaluation of the performance of the wind turbine installation during the voltage dip can always be performed. However, in the inventive method an automated evaluation of the variables is performed (step 218). The evaluation is performed on the basis of a comparison of the measured variables with requirements for the performance of these variables during the voltage dip, which can for example originate from grid codes 220. Further requirements may be added to this, which may for example be defined by the manufacturer of the wind turbine installation, the operator of the wind turbine installation or a certifier. These requirements 222, together with the requirements 220 originating from the grid codes, are compared with the data obtained from the measurement in step 210.

The evaluation is performed in the present exemplary embodiment on the basis of a traffic-light display, in which green stands for compliance with the requirements and red for noncompliance with the requirements. The color amber can be reserved for an intermediate stage, for example for compliance with the requirements which is however toward the limit of the permitted values. Other options for displaying the result of the evaluation can for example comprise percentage indicators that represent how far away the measured values for the relevant variables are from the limits of the permitted ranges. Another display option is to display the result of the evaluation in the form of a score, with the lowest score indicating noncompliance with the requirements and the highest score indicating optimum compliance with the requirements. Intermediate scores can then for example be awarded for less optimum compliance with the requirements, in which however the measured values do not fall outside the permitted value ranges.

The result of the evaluation is output to the PC 15 in step 224, where it is displayed using the traffic-light system or in another suitable way, for example together with the most important plots. If a report is to be generated from the result of the evaluation (step 226), the analysis unit 5 generates a report in step 228, in which the result of the evaluation is provided in a standardized form for output to the documentation unit 7 (step 230). The report can optionally also comprise at least the most important plots and tables. After this the analysis is concluded (step 232).

With the inventive method described the testing of a wind turbine installation in respect of its performance when riding through voltage dips (Low Voltage Fault Ride Through) can be performed fully automatically. As a result the cost of the test can be cut and the reproducibility increased. The test can in this case be performed either at an individual wind turbine or a group of wind turbines that are jointly linked to a grid. The term wind turbine installation, as used in the description, should hence comprise both the individual wind turbine and also a number of wind turbines jointly linked to a grid.

The invention claimed is:

1. A test apparatus for testing a wind turbine installation with a control system in respect of riding through a voltage dip, comprising:
   a measured data capture unit with an interface for connection to the control system of the wind turbine installation and for capturing measured data from the control system,
   a measured data converter connected to the measured data capture unit in order to receive the captured measured data, which combines the captured measured data to form a standardized measured dataset, and
   an analysis unit connected to the measured data converter in order to receive the measured dataset, the analysis unit further comprising:
   a rule memory, in which calculation rules for calculating the values of particular variables from the measured dataset are stored,
   a requirements memory, in which permitted values for the particular variables are stored,
   a criteria memory, in which evaluation criteria are stored, a calculation unit connected to the measured data converter and the rule memory, which derives values for the particular variables from the measured dataset, a comparison unit connected to the calculation unit and the requirements memory, which compares the values derived for the particular variables with the permitted values contained in the requirements memory, an evaluation unit connected to the comparison unit and the criteria memory, which performs an evaluation of the comparison in accordance with the evaluation criteria and keeps the result of the evaluation ready for output.

2. The test apparatus as claimed in claim 1, further comprising a display unit for displaying the evaluation, connected to the analysis unit in order to receive the evaluation output.

3. The test apparatus as claimed in claim 1, further comprising a documentation unit, which is connected to the analysis unit in order to receive the evaluation output and which saves the evaluation received.

4. The test apparatus as claimed claim 1, further comprising a logging unit, which is connected to the analysis unit in order to receive the variables derived from the measured dataset and which logs the variables received.

5. The test apparatus as claimed in claim 1, further comprising a measured data logging unit, which is connected to the measured data capture unit in order to receive the measured data and which logs the measured data received.

6. The test apparatus as claimed in claim 1, further comprising a measured dataset logging unit, which is connected to the measured data converter in order to receive the measured dataset and which logs the measured dataset received.

\* \* \* \* \*